(12) United States Patent
Yang et al.

(10) Patent No.: US 8,289,278 B2
(45) Date of Patent: Oct. 16, 2012

(54) POINTING DEVICE AND METHOD OF ENABLING A POINTING DEVICE TO GENERATE A CONTROL SIGNAL

(75) Inventors: Yan-Mei Yang, Chiayi (TW); Jen-Chieh Yu, Taipei County (TW)

(73) Assignee: Memsor Corporation, Hsinchu (TW)

( * ) Notice: Subject to any disclaimer, the term of this patent is extended or adjusted under 35 U.S.C. 154(b) by 326 days.

(21) Appl. No.: 12/787,233

(22) Filed: May 25, 2010

(65) Prior Publication Data

US 2010/0302149 A1    Dec. 2, 2010

(30) Foreign Application Priority Data

May 27, 2009 (TW) ................................ 98117888 A
Mar. 31, 2010 (TW) ................................ 99109872 A

(51) Int. Cl.
*G06F 3/033* (2006.01)
(52) U.S. Cl. ...................................................... 345/157
(58) Field of Classification Search .......... 345/156–184
See application file for complete search history.

(56) References Cited

U.S. PATENT DOCUMENTS

| | | | | |
|---|---|---|---|---|
| 5,432,530 A | * | 7/1995 | Arita et al. | 345/159 |
| 5,831,596 A | * | 11/1998 | Marshall et al. | 345/161 |
| 6,326,948 B1 | * | 12/2001 | Kobachi et al. | 345/157 |
| 7,595,712 B2 | * | 9/2009 | Nishino et al. | 335/207 |
| 7,733,327 B2 | * | 6/2010 | Harley et al. | 345/157 |

* cited by examiner

*Primary Examiner* — Liliana Cerullo
(74) *Attorney, Agent, or Firm* — Dickstein Shapiro LLP

(57) ABSTRACT

A pointing device includes: a magneto-electric transducer for detecting a variation in magnetic field of a magnetic element carried on an operator due to movement of the operator relative to an original position and for generating a voltage signal based on a detection result made thereby; a sampling unit for sampling the voltage signal to generate a sampling voltage; and a processing unit operable to generate a control signal corresponding to the movement of the operator upon detecting one of that the sampling voltage is not within a voltage range and that the sampling voltage is within the voltage range while a displacement of the operator from the original position is greater than a predetermined distance. A method of enabling a pointing device to generate a control signal is also disclosed.

17 Claims, 4 Drawing Sheets

POINTING DEVICE AND METHOD OF ENABLING A POINTING DEVICE TO GENERATE A CONTROL SIGNAL

CROSS-REFERENCE TO RELATED APPLICATION

This application claims priority of Taiwanese Application Nos. 098117888 and 099109872, filed on May 27, 2009 and Mar. 31, 2010, respectively.

BACKGROUND OF THE INVENTION

1. Field of the Invention

The invention relates to a pointing device, and more particularly to a pointing device and method of enabling a pointing device to generate a control signal using magneto-electric conversion.

2. Description of the Related Art

FIGS. 1 and 2 illustrate a conventional pointing device that includes: an operator 18 supported on a base 17 and movable relative to a central axis (O') of the base 17 in a direction (A) transverse to the central axis (O'); a magnet 11 carried on the operator 18 and disposed coaxially with the operator 18 in the base 17; a biasing member 12, such as a spring piece, disposed coaxially in the base 17 for biasing the operator 18 toward the central axis (O'); two magneto-electric transducers 13 opposite to each other in the direction (A) and disposed adjacent to the magnet 11; a differential amplifier 14 having inverting and non-inverting input ends coupled respectively to the magneto-electric transducers 13; a sampling unit 15 coupled to an output end of the differential amplifier; and a processing unit 16 coupled to the sampling unit 15.

Each magneto-electric transducer 13 detects magnetic field strength of the magnet 11 and generates an analog voltage signal based on a detection result made thereby.

The differential amplifier 14 receives the voltage signals from the magneto-electric transducers 13 and outputs a differential signal to the sampling unit 15.

The sampling unit 15 samples the differential signal from the differential amplifier 14 so as to generate a digital sampling voltage.

The processing unit 16 determines whether the sampling voltage from the sampling unit 15 is within a fixed voltage range corresponding to a reference displacement of the operator 18 from the central axis (O'). The processing unit 16 generates a control signal upon detecting that the sampling voltage is not within the voltage range, wherein the control signal is obtained by subtracting a center value in the voltage range from the sampling voltage. In this case, the control signal includes a polarity indicating an orientation of the magnet 11 (or the operator 18) relative to the central axis (O'), and a magnitude indicating a displacement of the magnet 11 (or the operator 18) from the central axis (O').

However, since the biasing member 12 easily experiences elastic fatigue after a long period of use, the biasing member 12 cannot ensure the operator 18 to move back to an original position in the central axis (O') such that misoperation of the conventional pointing device may be caused.

In order to avoid misoperation of the conventional pointing device, a larger reference displacement is required for the conventional pointing device to operate. The conventional pointing device therefore cannot ensure sensitivity in a relatively small operating area during use.

SUMMARY OF THE INVENTION

Therefore, an object of the present invention is to provide a pointing device and method of enabling a pointing device to generate a control signal that can overcome the aforesaid drawbacks of the prior art.

According to one aspect of the present invention, a pointing device comprises:

a base;

an operator supported on the base and movable relative to an original position in a horizontal direction;

a magnetic element mounted on the operator and movable with the operator;

at least one magneto-electric transducer disposed adjacent to the magnetic element for detecting a variation in magnetic field of the magnetic element due to movement of the operator and for generating a voltage signal based on a detection result made thereby;

a sampling unit coupled to the magneto-electric transducer for receiving the voltage signal therefrom, and sampling the voltage signal so as to generate a sampling voltage;

a storage unit for storing therein reference information corresponding to a voltage range from a lower limit value to an upper limit value; and a processing unit coupled to the sampling unit and the storage unit, receiving the sampling voltage from the sampling unit, operable to determine, based on the reference information stored in the storage unit and the sampling voltage received thereby, whether the sampling voltage is within the voltage range and whether a displacement of the operator from the original position is greater than a predetermined distance, and to generate a control signal corresponding to the movement of the operator upon detecting one of that the sampling voltage is not within the voltage range and that the sampling voltage is within the voltage range while the displacement of the operator is greater than the predetermined distance.

According to another aspect of the present invention, there is provided a method of enabling a pointing device to generate a control signal. The pointing device includes an operator carried with a magnetic element thereon, and a magneto-electric transducer disposed spacedly adjacent to the magnetic element. The control signal corresponds to movement of the operator relative to an original position in a horizontal direction. The magneto-electric transducer generates a voltage signal based on a variation in magnetic field of the magnetic element due to the movement of the operator. The method comprises the steps of:

a) sampling the voltage signal so as to generate a sampling voltage;

b) determining whether the sampling voltage is within a voltage range from a lower limit value to an upper limit value; and c) generating the control signal based on a result determined in step b), the sampling voltage generated in step a) and at least one reference voltage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
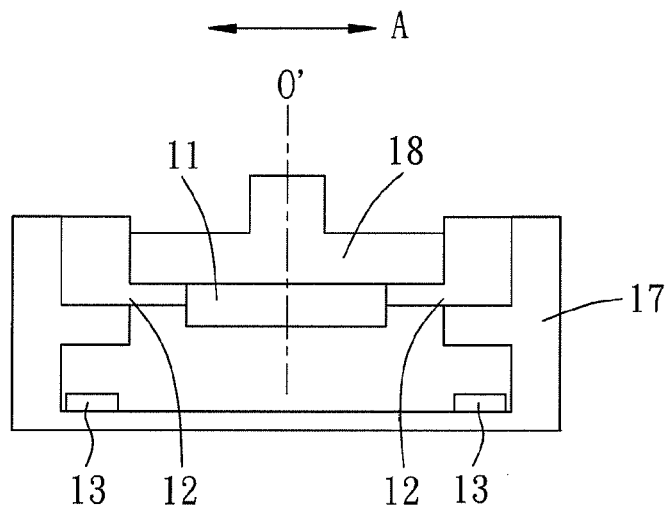
FIG. 1 is a schematic view of a conventional pointing device.
Figure 2:
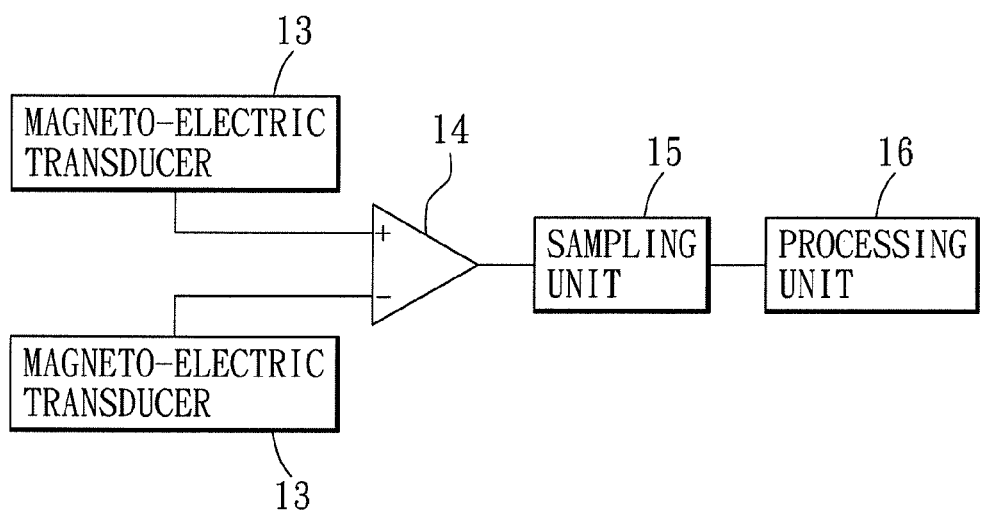
FIG. 2 is a schematic circuit block diagram illustrating the conventional pointing device.

Before the present invention is described in greater detail, it should be noted that like elements are denoted by the same reference numerals throughout the disclosure.

Figure 3:
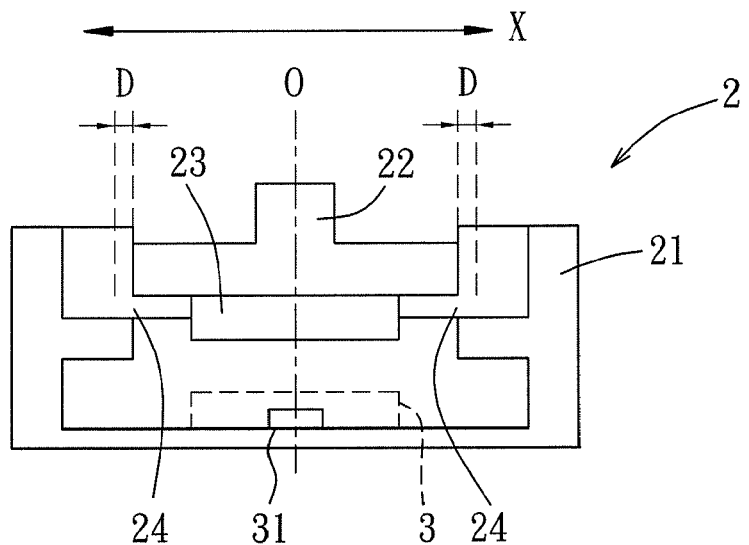
FIG. 3 is a schematic view showing a pointing device that is configured for implementing the first preferred embodiment of a method of enabling a pointing device to generate a control signal according to the present invention.
Figure 4:
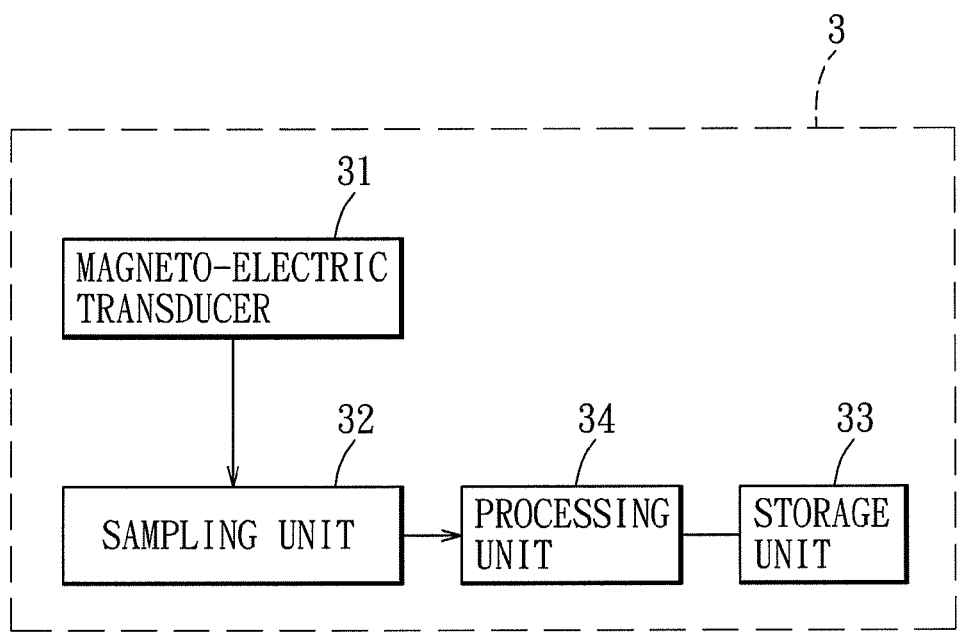
FIG. 4 is a schematic circuit block diagram illustrating an integrated circuit of the pointing device.

FIGS. 3 and 4 illustrate a pointing device 2 that is configured for implementing the first preferred embodiment of a method of the present invention. The pointing device 2 includes a base 21, an operator 22, a magnetic element 23, a biasing member 24, a magneto-electric transducer 31, a sampling unit 32, a storage unit 33 and a processing unit 34. In this embodiment, the magneto-electric transducer 31, the sampling unit 32, the storage unit 33 and the processing unit 34 are integrated into a single integrated circuit 32.

The operator 22 is supported on the base 21, and is movable relative to an original position in a horizontal direction (X). In this embodiment, the operator 22 is disposed coaxially in the base 21. The original position is located in a central axis (O) of the base 21 transverse to the horizontal direction (X).

The magnetic element 23, such as a magnet, is mounted on the operator 22 and is movable with the operator 22. In this embodiment, the magnetic element 23 is disposed coaxially in the base 21.

In this embodiment, the biasing member 24, such as a spring piece, is disposed coaxially in the base 21 for biasing the operator 22 toward the position.

The integrated circuit 3 is disposed in the base 21. The magneto-electric transducer 31 is disposed adjacent to the magnetic element 23 for detecting a variation in magnetic field of the magnetic element 23 due to movement of the operator 22 and for generating a voltage signal based on a detection result made thereby. The voltage signal is an analog signal. The sampling unit 32 is coupled to the magneto-electric transducer 31 for receiving the voltage signal therefrom. The storage unit 33 stores therein reference information corresponding to a voltage range from a lower limit value to an upper limit value, reference voltage data and a reference control signal. The reference voltage includes a plurality of reference voltages in this embodiment. The processing unit 34 is coupled to the sampling unit 32 and the storage unit 33.

Figure 5:
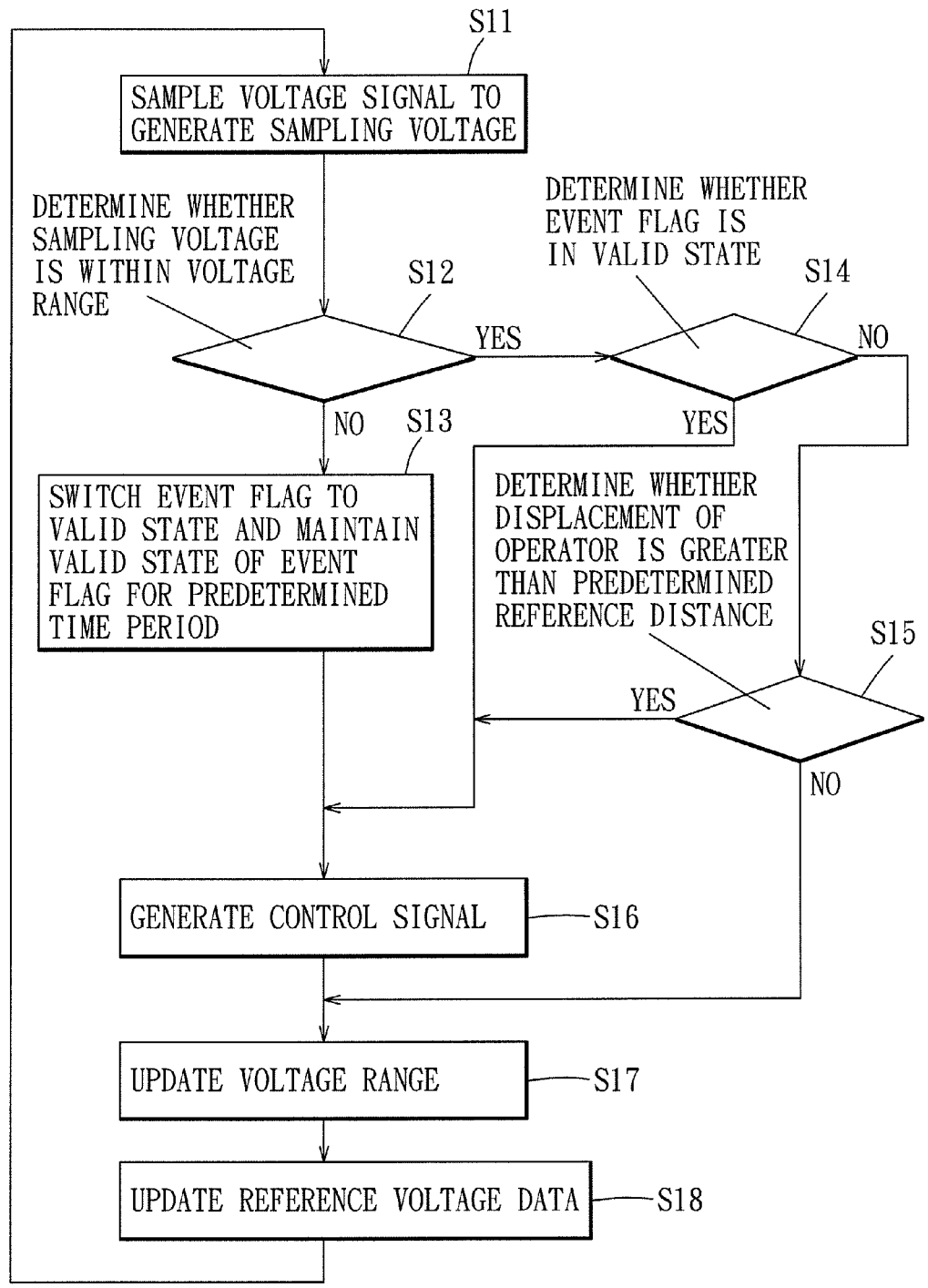
FIG. 5 is a flow chart illustrating how the pointing device generates a control signal according to the method of the first preferred embodiment.

Referring to FIG. 5, there is shown a flow chart to illustrate how the pointing device 2 generates a control signal in accordance with the method of the first preferred embodiment.

In step S11, the sampling unit 32 samples the voltage signal generated thereby to generate a sampling voltage.

In step S12, the processing unit 34 is configured to determine, based on the reference information stored in the storage unit 33 and the sampling voltage received thereby, whether the sampling voltage is within the voltage range. If not, the flow goes to step S13. Otherwise, the flow goes to step S14.

In step S13, the processing unit 34 is configured to switch a preset event flag to a valid state and to maintain the valid state of the event flag for a predetermined time period. In this embodiment, the predetermined time period is greater than the sampling period of the sampling unit 32. Then, the flow proceeds to step S16.

In step S14, the processing unit 34 is configured to determine, based on the sampling voltage, whether the event flag is in the valid state. If affirmative, the flow goes to step S16. Otherwise, the flow goes to step S15.

In step S15, the processing unit 34 is configured to determine, based on the sampling voltage, whether a displacement of the operator 22 from the original position (the central axis (O')) is greater than a predetermined distance (D) (see FIG. 3). If affirmative, the flow goes to step S16. Otherwise, the flow goes to step S17.

In step S16, when the event flag is in the valid state (step S13) or when the event flag is not in the valid state while the displacement of the operator 22 is greater than the predetermined distance (D), the processing unit 34 is configured to generate a control signal corresponding to the movement of the operator 22 based on the sampling voltage, and the reference voltage data and the reference control signal stored in the storage unit 33. In this embodiment, when the event flag is in the valid state, the control signal generated by the processing unit 34 is equal to a result obtained by subtracting one of the reference voltages of the reference voltage data from the sampling voltage generated by the sampling unit 32. In this case, the processing unit 34 is further configured to update the reference control signal stored in the storage unit 33 with the control signal generated thereby. It is noted that, initially, said one of the reference voltages of the reference voltage data is equal to an original sampling voltage obtained by the sampling unit 32 under a condition where the operator 22 is at the original position. On the other hand, in this embodiment, when the event flag is not in the valid state while the displacement of the operator 22 is greater than the predetermined distance (D), the control signal generated by the processing unit 34 is equal to a result obtained by subtracting the original sampling voltage from the sampling voltage generated by the sampling unit 32. Alternatively, the control signal is equal to the reference control signal stored in the storage unit 33. The control signal generated by the processing unit 34 includes a polarity indicating an orientation of the operator 22 (or the magnetic element 23) relative to the central axis (O), and a magnitude indicating the current displacement of the operator 22 (or the magnetic element 23) from the previous position of the operator 22.

In step S17, the processing unit 34 is configured to update the reference information stored in the storage unit 33 based on the sampling voltage generated by the sampling unit 32 and the reference voltage data stored in the storage unit 33. In this embodiment, the lower limit value of the voltage range is updated with a smallest one of the sampling voltage generated by the sampling unit 32 and the reference voltages of the reference voltage data stored in the storage unit 33. The upper limit value of the voltage range is updated with a largest one of the sampling voltage generated by the sampling unit 32 and the reference voltages of the reference voltage data stored in the storage unit 33. Alternatively, the processing unit 34 updates the reference information stored in the storage unit further based on predetermined first and second margin values such that the lower limit value of the voltage range is updated with a result made by subtracting the predetermined first margin value from the sampling voltage generated by the sampling unit 32, and that the upper limit value of the voltage range is updated with a result made by adding the predetermined second margin value to the sampling voltage generated by the sampling unit 32.

In step S18, the processing unit 34 is configured to update the reference voltage data stored in the storage unit 33 based on the sampling voltage generated by the sampling unit 32 such that the sampling voltage is stored into the storage unit and serves as one reference voltage. As such, the reference voltages of the reference voltage data stored in the storage unit 33 can be respectively updated with the sampling voltages continuously generated by the sampling unit 32 during a period of time. Thereafter, the flow goes back to step S11.

Hence, according to the method of the first preferred embodiment, the pointing device 2 is able to generate the control signal when the event flag is in the valid state and when the event flag is not in the valid state while the displacement of the operator 22 is greater than the predetermined distance (D).

Figure 6:
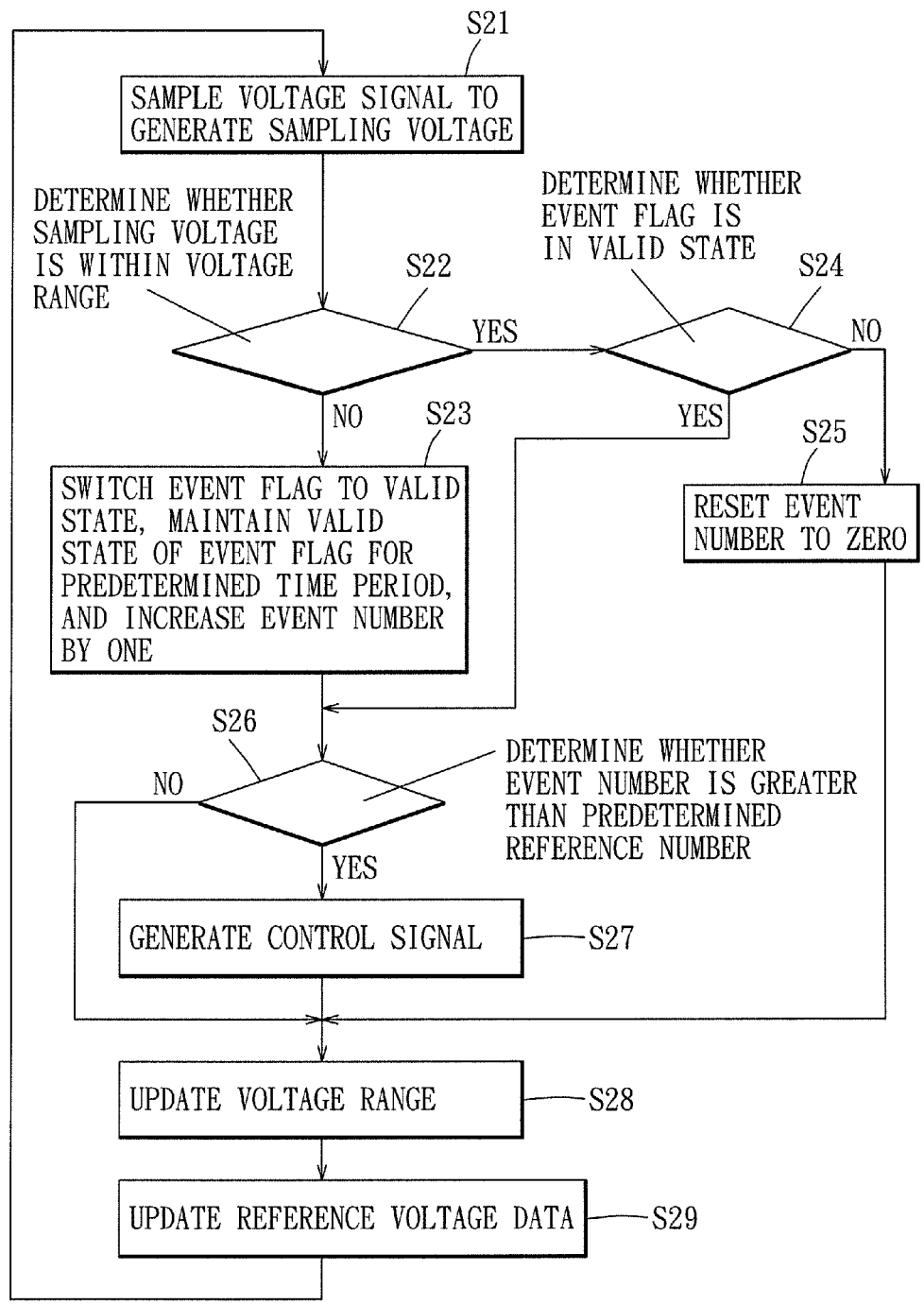
FIG. 6 is a flow chart illustrating the second preferred embodiment of a method of enabling a pointing device to generate a control signal according to the present invention.

Referring to FIG. 6, there is shown a flow chart to illustrate the second preferred embodiment of a method of enabling a pointing device to generate a control signal. In this embodiment, the pointing device is identical to that in the first preferred embodiment.

The method of the second preferred embodiment includes steps S21~S29. Since steps S21, S22, S28, S29 are similar to steps S11, S12, S17, S18 in the first preferred embodiment, respectively, details of the same are omitted herein for the sake of brevity.

In step S23, when the sampling voltage generated by the sampling unit 32 is not within the voltage range, i.e., if not affirmative in step S22, the processing unit 34 is configured to switch the event flag to the valid state, to maintain the valid state of the event flag for the predetermined time period, and to increase a preset event number by one. Then, the flow proceeds to step S26.

In step S24, when the sampling voltage generated by the sampling unit 32 is within the voltage range, i.e., if affirmative in step S22, the processing unit 34 is configured to determine whether the event flag is in the valid state. If affirmative, the flow goes to step S26. Otherwise, the flow proceeds to step S25.

In step S25, the processing unit 34 is configured to reset the event number to zero. Then, the flow goes to step S28.

In step S26, when the event flag is in the valid state, the processing unit 34 is configured to determine whether the event number is greater than a predetermined reference number. If affirmative, the flow proceeds to step S27. Otherwise, the flow goes to step S28.

In step 27, when the event flag is in the valid state while the event number is greater than the predetermined reference number, the processing unit 34 is configured to generate a control signal based on the sampling voltage generated by the sampling unit 32 and the reference voltage data. In this embodiment, the control signal generated by the processing unit 34 is equal to a result obtained by subtracting one of the reference voltages of the reference voltage data stored in the storage unit 33 from the sampling voltage generated by the sampling unit 32.

Hence, according to the method of the second preferred embodiment, the pointing device is able to generate the control signal when the event flag is in the valid state while the event number is greater than the predetermined reference number.

To sum up, since dynamic adjustment of the voltage range can be attained in accordance with the method of the present invention, misoperation encountered in the prior art can be avoided without requiring the larger reference displacement of the aforesaid conventional pointing device. Therefore, the pointing device 2 configured in accordance with the method of the present invention can ensure sensitivity in a relatively small operating area during use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pointing device comprising:
a base;
an operator supported on said base and movable relative to an original position in a horizontal direction;
a magnetic element mounted on said operator and movable with said operator;
at least one magneto-electric transducer disposed adjacent to said magnetic element for detecting a variation in magnetic field of said magnetic element due to movement of said operator and for generating a voltage signal based on a detection result made thereby;
a sampling unit coupled to said magneto-electric transducer for receiving the voltage signal therefrom, and sampling the voltage signal so as to generate a sampling voltage;
a storage unit for storing therein reference information corresponding to a voltage range from a lower limit value to an upper limit value; and
a processing unit coupled to said sampling unit and said storage unit, receiving the sampling voltage from said sampling unit, operable to determine, based on the reference information stored in said storage unit and the sampling voltage received thereby, whether the sampling voltage is within the voltage range and whether a displacement of said operator from the original position is greater than a predetermined distance, and to generate a control signal corresponding to the movement of said operator upon detecting one of that the sampling voltage is not within the voltage range and that the sampling voltage is within the voltage range while the displacement of said operator is greater than the predetermined distance,
wherein said storage unit further stores therein reference voltage data that includes at least one reference voltage, and a reference control signal;
when the sampling voltage is not within the voltage range, said processing unit generates the control signal based on the sampling voltage received thereby and the reference voltage of the reference voltage data stored in said storage unit such that the control signal is equal to a result obtained by subtracting the reference voltage from the sampling voltage; and
said processing unit is further operable to update the reference control signal stored in said storage unit with the control signal generated thereby.

2. The pointing device as claimed in claim 1, wherein, when the sampling voltage is within the voltage range while the displacement of said operator is greater than the predetermined distance, said processing unit generates the control signal based on the sampling voltage received thereby, and the reference voltage data and the reference control signal stored in said storage unit such that the control signal is equal to one of the reference control signal, and a result obtained by subtracting the reference voltage from the sampling voltage generated by said sampling unit.

3. The pointing device as claimed in claim 2, wherein the reference voltage of the reference voltage data stored in said storage unit is equal to an original sampling voltage obtained by said sampling unit under a condition where said operator is at the original position.

4. The pointing device as claimed in claim 1, further comprising a biasing member for biasing said operator to move toward the original position.

5. The pointing device as claimed in claim 1, wherein said processing unit is further operable to update the reference information stored in said storage unit based on at least the sampling voltage generated by said sampling unit.

6. The pointing device as claimed in claim 5, wherein the reference information is updated further based on the reference voltage data stored in said storage unit such that the lower limit value of the voltage range is updated with a smaller one of the sampling voltage generated by said sampling unit and the reference voltage of said reference voltage data stored in said storage unit and that the upper limit value of the voltage range is updated with the other one of the sampling voltage generated by said sampling unit and the reference voltage of said reference voltage data.

7. The pointing device as claimed in claim 5, wherein the reference information is updated further based on predetermined first and second margin values such that the lower limit value of the voltage range is updated with a result made by subtracting the predetermined first margin value from the sampling voltage generated by said sampling unit and that the upper limit value of the voltage range is updated with a result made by adding the predetermined second margin value to the sampling voltage generated by said sampling unit.

8. The pointing device as claimed in claim 1, wherein said processing unit is further operable to update the reference voltage data stored in said storage unit based on the sampling voltage generated by said sampling unit such that the sampling voltage is stored into said storage unit and serves as the reference voltage.

9. The pointing device as claimed in claim 1, wherein said magneto-electric transducer, said sampling unit, said storage unit and said processing unit are integrated into a single integrated circuit.

10. A method of enabling a pointing device to generate a control signal, the pointing device including an operator carried with a magnetic element thereon, and a magneto-electric transducer disposed spacedly adjacent to the magnetic element, the control signal corresponding to movement of the operator relative to an original position in a horizontal direction, the magneto-electric transducer generating a voltage signal based on a variation in magnetic field of the magnetic element due to the movement of the operator, said method comprising the steps of:
  a) sampling the voltage signal so as to generate a sampling voltage;
  b) determining whether the sampling voltage is within a voltage range from a lower limit value to an upper limit value;
  b-1) when it is determined in step b) that the sampling voltage is not within the voltage range, switching a preset event flag to a valid state and maintaining the valid state of the event flag for a predetermined time period;
  b-2) when it is determined in step b) that the sampling voltage is within the voltage range, determining whether the event flag is in the valid state;
  c) generating the control signal based on a result determined in step b), the sampling voltage generated in step a) and at least one reference voltage,
  wherein, in step c), when the event flag is in the valid state, the control signal is generated based on the sampling voltage generated in step a) and the reference voltage such that the control signal is equal to a result obtained by subtracting the reference voltage from the sampling voltage generated in step a), and a reference control signal is updated with the control signal thus generated.

11. The method as claimed in claim 10, wherein further comprising, prior to step c), the step of:
  b-3) when it is determined in step b-2) that the event flag is not in the valid state, determining whether a displacement of the operator from the original position is greater than a predetermined distance;
  wherein, in step c), when it is determined in step b-3) that the displacement of the operator is greater than the predetermined distance, the control signal is generated based on the reference control signal, the reference voltage and the sampling voltage generated in step a) such that the control signal is equal to one of the reference control signal and a result obtained by subtracting the reference voltage from the sampling voltage generated in step a).

12. The method as claimed in claim 10, wherein, in step b), the reference voltage is initially equal to an original sampling voltage obtained under a condition where the operator is at the original position.

13. The method as claimed in claim 10, wherein step b-1) further comprises increasing a preset event number by one;
  wherein prior to step c), the method comprises the step of:
  determining whether the event number is greater than a predetermined reference number;
  wherein, in step c), when it is determined in step b-3) that the event number is greater than the predetermined reference number, the control signal is generated based on the sampling voltage generated in step a) and the reference voltage such that the control signal is equal to a result obtained by subtracting the reference voltage from the sampling voltage generated in step a).

14. The method as claimed in claim 13, further comprising, prior to step c), the step of:
  b-4) when it is determined in step b-2) that the event flag is not in the valid state, resetting the event number to zero.

15. The method as claimed in claim 10, further comprising the step of:
  d) updating the voltage range based on at least the sampling voltage generated in step a).

16. The method as claimed in claim 15, wherein, in step d), the voltage range is updated further based on the reference voltage such that the lower limit value of the voltage range is updated with a smaller one of the sampling voltage generated in step a) and the reference voltage and that the upper limit value of the voltage range is updated with the other one of the sampling voltage generated in step a) and the reference voltage.

17. The method as claimed in claim 15, wherein, in step d), the voltage range is updated further based on predetermined first and second margin values such that the lower limit value of the voltage range is updated with a result made by subtracting the predetermined first margin value from the sampling voltage generated in step a) and that the upper limit value of the voltage range is updated with a result made by adding the predetermined second margin value to the sampling voltage generated in step a).

* * * * *